United States Patent [19]

Kitani et al.

[11] Patent Number: 5,187,595
[45] Date of Patent: Feb. 16, 1993

[54] PHOTOELECTRIC CONVERSION DEVICE HAVING IMPROVED ILLUMINATION AND INFORMATION PROCESSING APPARATUS MOUNTING THE DEVICE

[75] Inventors: Masashi Kitani, Yokohama; Tatsundo Kawai, Kanagawa; Hiroo Ichihashi, Chigasaki, all of Japan

[73] Assignee: Canon Kabushiki Kaisha, Tokyo, Japan

[21] Appl. No.: 616,831

[22] Filed: Nov. 21, 1990

[30] Foreign Application Priority Data

Nov. 21, 1989 [JP] Japan .................. 1-302672

[51] Int. Cl.$^5$ ............................................. H04N 1/04
[52] U.S. Cl. .................................. 358/482; 358/475; 358/484
[58] Field of Search ............... 358/475, 901, 482, 484; 355/1; 385/146

[56] References Cited

U.S. PATENT DOCUMENTS

| | | | |
|---|---|---|---|
| 3,544,713 | 12/1970 | Case | 178/7.1 |
| 4,482,804 | 11/1984 | Oritsuki et al. | 250/211 J |
| 4,680,644 | 7/1987 | Shirato et al. | 358/294 |
| 4,723,129 | 2/1988 | Endo et al. | 346/1.1 |
| 4,740,796 | 4/1988 | Endo et al. | 346/1.1 |
| 4,763,189 | 8/1988 | Komatsu et al. | 358/75 |
| 4,942,481 | 7/1990 | Yoshinouchi et al. | 358/484 |
| 5,101,285 | 3/1992 | Kawai et al. | 358/471 |

*Primary Examiner*—Jin F. Ng
*Assistant Examiner*—Edward Lefkowitz
*Attorney, Agent, or Firm*—Fitzpatrick, Cella, Harper & Scinto

[57] ABSTRACT

Apparatus for improving illumination in a photoelectric conversion device having a light source for illuminating an original, and at least one photoelectric conversion element for receiving light reflected from the original includes a light guide for guiding light from the light source to the original, the light guide having at least one side surface. A correction section is provided and is disposed adjacent the side surface of the light guide. The correction section acts to suppress total reflection of at least a portion of the light emitted from the light source. Preferably, the correction section comprises regularly spaced light absorbing or light diffusing elements formed on the side of the light guide. The improvement apparatus may be employed in an information processing apparatus such as a facsimile machine.

21 Claims, 9 Drawing Sheets

PHOTOELECTRIC CONVERSION DEVICE HAVING IMPROVED ILLUMINATION AND INFORMATION PROCESSING APPARATUS MOUNTING THE DEVICE

BACKGROUND OF THE INVENTION

1. Field of the Invention

The present invention relates to a photoelectric conversion device, and more particularly, to a photoelectric conversion device used as an input unit for a facsimile machine, an image reader, a digital copying machine, an electronic blackboard or the like.

2. Related Background Art

Recently, long line sensors having optical systems with a one-to-one magnification ratio have been developed as photoelectric conversion devices for the purpose of providing small and high-performance facsimile machines, image readers, and the like.

Furthermore, for the purpose of providing small and inexpensive devices, photoelectric conversion devices have also been proposed in which a sensor directly detects light reflected from an original via a transparent spacer made of glass or the like without using a fiber lens array with a one-to-one magnification ratio.

Figure 1:
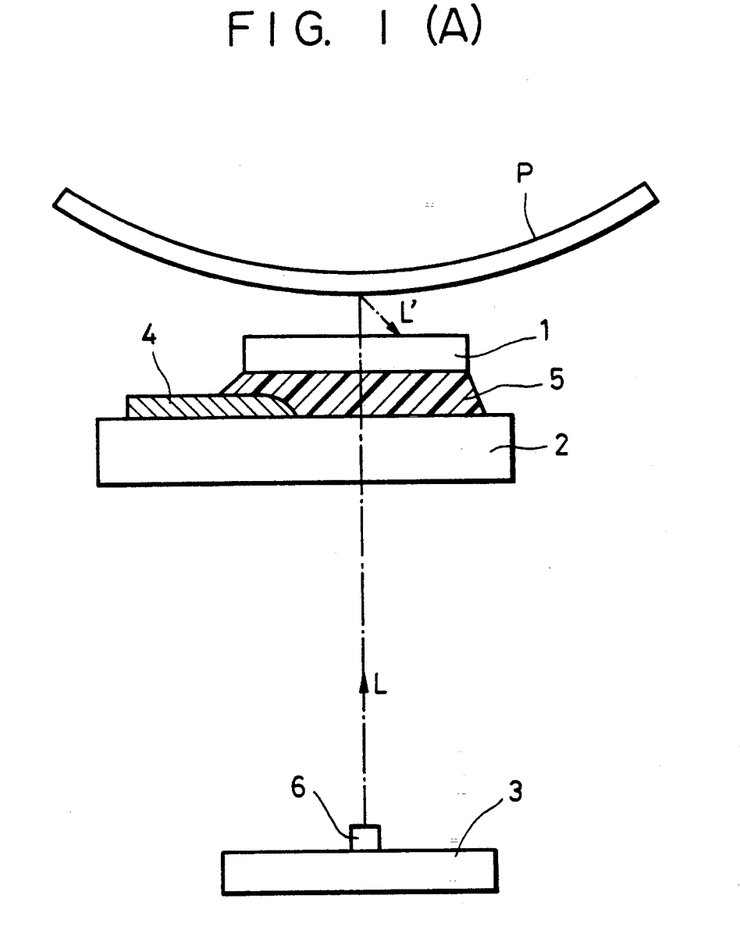
FIG. 1(A) is a schematic cross-sectional view showing an example of a photoelectric conversion device.
FIG. 1(B) is a schematic cross-sectional view showing an example of the photoelectric conversion device.

FIGS. 1(A) and 1(B) schematically show an example of a photoelectric conversion device. The photoelectric conversion device has been proposed by a research group of the assignee in U.S. patent application Ser. No. 481,227 filed Feb. 20, 1990. FIG. 1(A) is a schematic cross-sectional view of the photoelectric conversion device, as seen from the main scanning direction of a photoelectric conversion element array. FIG. 1(B) is a schematic cross-sectional view of the device, as seen from the subscanning direction of the photoelectric conversion element array.

In FIGS. 1(A) and 1(B), a transparent sensor substrate 1 includes photoelectric conversion elements (not shown) formed on a transparent substrate, made of glass or the like, by a semiconductor process or the like, and an illuminating window (not shown). A transparent mounting substrate 2 includes an interconnection wiring member 4 formed on a transparent substrate, made of glass or the like, by a thick film printing method, a photolithographic method or the like. The interconnection member 4 electrically connects the transparent sensor substrate 1 to a driving circuit unit (not shown) provided on the transparent mounting substrate 2. The transparent sensor substrate 1 is bonded on the transparent mounting substrate 2 by an adhesive layer 5. A light source 3 for emitting light for illuminating an original P comprises an LED array having a plurality of LED chips 6 arranged in the form of an array.

The reading position rf the original P, the position of the illuminating window in the transparent sensor substrate 1, and the optical axis of the light source 3 in the direction of the array are set to positions which exist within a vertical plane descending from the reading position of the original P, as shown by arrow L.

Illuminating light L from the light source 3 is projected onto the original P after passing through the transparent mounting substrate 2 and the illuminating window within the transparent sensor substrate 1. Light reflected from the original P is incident upon the photoelectric conversion elements on the transparent sensor substrate 1, and is subjected to photoelectric conversion by the photoelectric conversion elements. The converted signal is output as an image signal.

However, in an attempt to provide a further inexpensive and smaller device, it has become clear that the above-described photoelectric conversion devices have the following technical problems.

As a means for providing an inexpensive photoelectric conversion device, it is possible to reduce the number of the LED chips and thus to reduce the cost of the light source.

When the number of the LED chips are reduced, the amount of light incident on the surface of the original is reduced, causing uneven illumination. This substantially deteriorates the quality of an image, especially when a white original is read.

In order to reduce the uneven illumination, it is possible to increase the distance between the LED array and the surface of the original. This approach, however, is by no means preferable, since the illumination substantially decreases, with distance and the photoelectric conversion device becomes large.

A plurality of LED chips can also be arrayed in a zigzag or a staggered form. As a result, there is a possibility that uneven light intensity will occur depending upon the accuracy of the placement. If that occurs, there is a danger that a satisfactory effect cannot be obtained when the number of LED chip is decreased.

SUMMARY OF THE INVENTION

It is an object of the present invention to provide a photoelectric conversion device and an information processing apparatus which are less expensive, more compact, and have higher performance than known devices.

It is a further object of the present invention to provide a photoelectric conversion device and an information processing apparatus in which excellent linear light distribution can be obtained even if the number of light-emitting sources is decreased.

It is a still further object of the present invention to provide a photoelectric conversion device and an information processing apparatus having improved illuminating systems in which substantially uniform information-bearing light can be obtained for any original to be read.

It is still another object of the present invention to provide a photoelectric conversion device and an information processing apparatus capable of correcting the illumination with an extremely simple arrangement even if a light-emitting source having some directional characteristics is used.

The above-described objects of the present invention can be achieved by a photoelectric conversion device comprising a substrate on which a plurality of photoelectric conversion elements are disposed and a light source in which a plurality of light-emitting sources are arrayed. Light emitted from the light source is made to illuminate an original and the reflected light is received by the photoelectric conversion element. The device further comprises a light guiding device disposed between the original and the light source, and a correction device is disposed on the side of the light guiding device.

According to a further aspect of the present invention, an information processing apparatus comprises a photoelectric conversion device as described above, a device for holding the original at a reading position, and a control device for controlling the photoelectric conversion device.

The objects of the present invention can be achieved by a contact type image sensor comprising a plurality of light-emitting sources that emit light for illuminating an original, a light source, a substrate having a light-transmitting portion that transmits the light, and a plurality of photoelectric conversion elements disposed on the substrate. A light guiding member, through which the light passes, is disposed between the substrate and the light source, and the light guiding member has a light incident surface, a light emission surface, and a side surface. A correction member is disposed on the side surface.

According to a further aspect of the present invention, apparatus for improving illumination in a photoelectric conversion device having a light source for illuminating an original, and at least one photoelectric conversion element for receiving light reflected from the original includes a light guide for guiding light from the light source to the original, the light guide having at least one side surface. A correction section is disposed adjacent the side surface and suppresses total reflection of at least a portion of the light emitted from the light source.

DETAILED DESCRIPTION OF THE PREFERRED EMBODIMENTS

The present invention will now be explained in detail by reference to the drawings.

Figure 2:
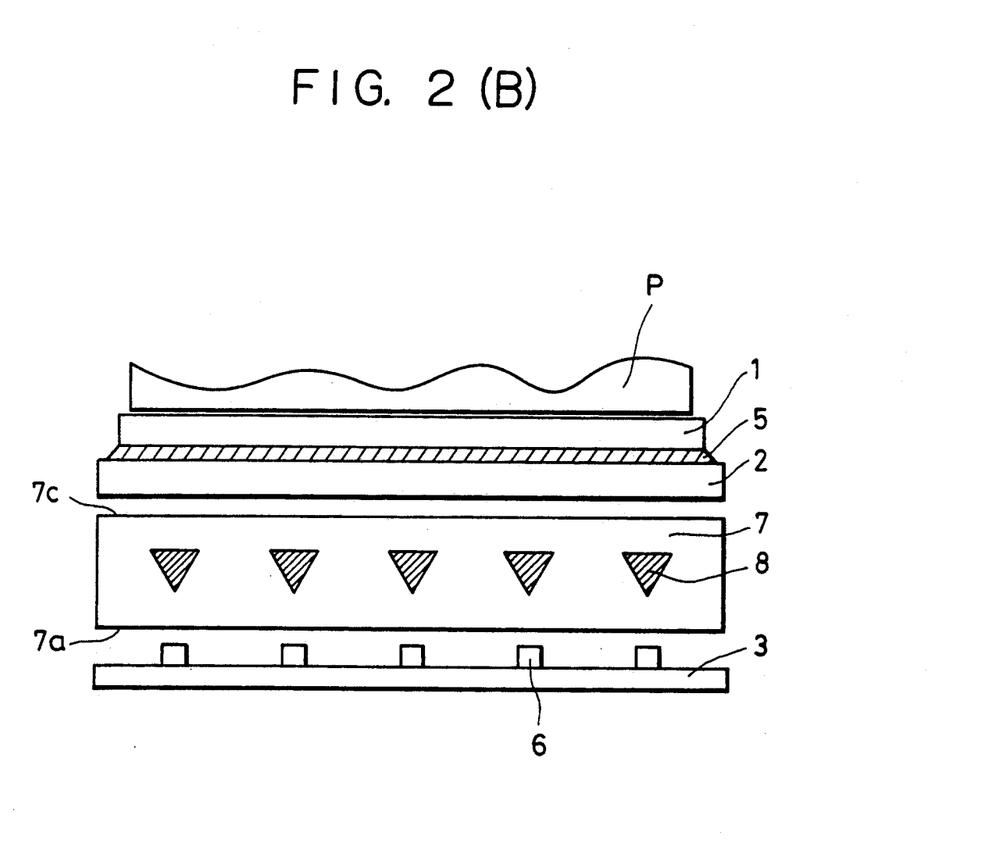
FIG. 2(A) is a schematic cross-sectional view of a photoelectric conversion device according to the present invention.
FIG. 2(B) is a schematic cross-sectional view of the photoelectric conversion device according to the present invention.
Figure 2A:
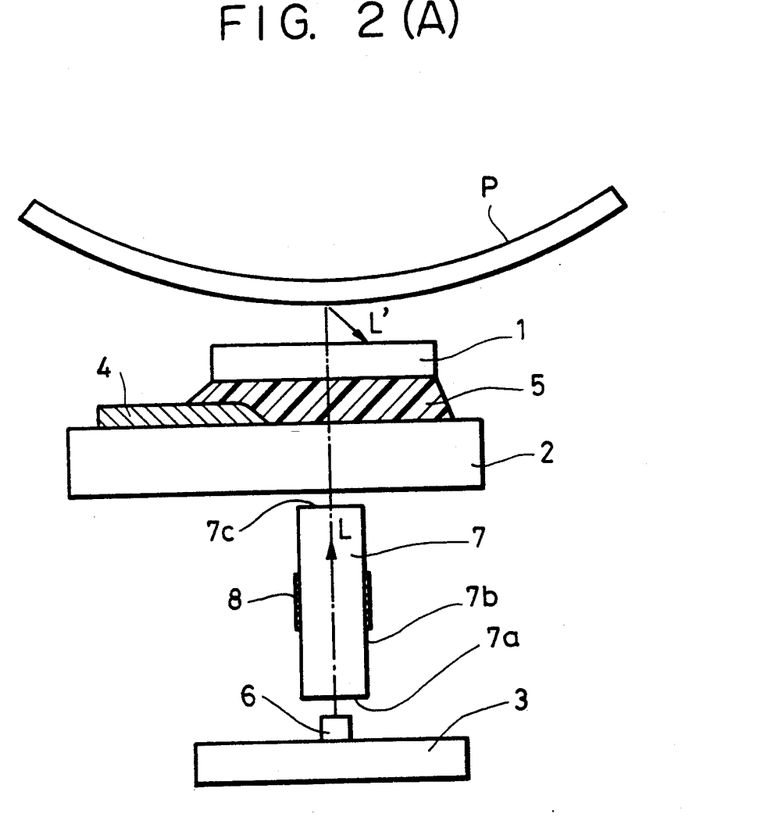

FIG. 2(A) and 2(B) are schematic cross-sectional views of a photoelectric conversion device according to the present invention. FIG. 2(A) is a schematic cross-sectional view of the photoelectric conversion device of the present invention, as seen from the main-scanning direction of a photoelectric conversion element array. FIG. 2(B) is a schematic side cross-sectional view of the device, as seen from the subscanning direction of the photoelectric conversion element array.

In FIGS. 2(A) and 2(B), a transparent sensor substrate 1 includes a photoelectric conversion element array formed on a transparent and insulating substrate made of fused quartz, silica glass, borosilicate glass, or the like by a semiconductor process or the like.

A transparent mounting substrate 2 includes an interconnection wiring member 4, made of Ag, Ag—Pd, Ag—Pt, Au or the like formed by a thick-film printing method, or Al, Cu, Mo, ITO (indium-tin oxide) or the like formed by a thick-film printing method and photolithography, provided on a transparent and insulating substrate made of fused quartz, silica glass, borosilicate glass, soda glass, acrylic resin (which may be provided with a protective layer made of $SiO_2$ or the like for preventing elution and diffusion of alkali elements) or the like.

The interconnection member 4 connects the photoelectric conversion element array to a driving circuit unit on the substrate 2 (not shown). The transparent sensor substrate 1 is bonded on the transparent mounting substrate 2 by an adhesive layer 5. For the adhesive layer 5, a transparent adhesive of a room-temperature-curable, heat-curable or photo-curable type or the like, made of a silicone-type, acryl-type, epoxy-type resin, or the like may be suitably used. It is preferred to use a material having a coefficient of thermal expansion and a refractive index which are close to those of each of the transparent sensor substrate 1 and the transparent mounting substrate 2. The transparent sensor substrate 1 and the interconnection wiring member 4 of the transparent mounting substrate 2 are electrically connected together using wire bonding, soldering, or the like.

If a substrate is divided into a plurality of parts and formed in the above way, the sensor substrate 1 and the mounting substrate 2 can be produced separately from each other, and therefore the yield of photoelectric conversion devices increases. In addition, since these two substrates 1 and 2 can be stacked, the area occupied by the substrates 1 and 2 is decreased, and e further miniaturization of the photoelectric conversion device is made possible.

The light source 3 is a pseudo-linear light source comprising an LED array in which a plurality of light-emitting sources comprising LED chips 6 are linearly arranged. It is possible to provide on the light source 3 a condenser lens as a light-condensing member for condensing light in the sub-scanning direction.

The reading position cf the original P, the position of the illuminating window in the transparent sensor substrate 1, and the optical axis of the light source 3 are set to positions which exist within a vertical plane descending from the reading position cf the original P.

A light-guiding means 7, disposed between the photoelectric conversion element array on the transparent sensor substrate 1 and the light source 3, efficiently and uniformly guides illuminating light L emitted form the light source 3 to the surface of the original while reducing unevenness in illuminating light beams.

The light-guiding means 7 has a length which nearly corresponds to the length of the light source 3 and the photoelectric conversion element array in the main-scanning direction, has the shape of a rectangular cross section longer in the main-scanning direction, and is made of a material, such as acrylic resin or the like.

Thus, the illuminating light L passes through the light-guiding means 7, the transparent mounting substrate 2, and the transparent sensor substrate 1, and is made to illuminate the original P. The information-bearing light L' reflected from the original P enters the photoelectric conversion element on the transparent sensor substrate 1, and picture image signals are output from the photoelectric conversion element.

An important feature cf the present invention is that a light-guiding means, on the side of which is disposed a correction means for suppressing total reflection of a part of the illuminating light, is disposed between the light source and the photoelectric conversion element.

Illuminating light L emitted form the light source 6 enters from an incident surface 7a (facing the light source 6) of the light-guiding means 7 into the light-guiding means 7. A part of the entered light L proceeds within the light-guiding means 7 is totally reflected by total reflection at side 7b of the light-guiding means 7, and reaches the exit surface 7c.

Regarding the illuminating light L, total reflection is suppressed en route within guide 7 by a light control section 8 (a light amount correction section) serving as a correction means which is disposed on one or both sides 7b of the light-guiding means 7, and it will be seen that illumination on the surface of the original is uniform.

The position at which the correction section 8 is disposed can be suitably determined depending upon the directional characteristic of the LED chips 6, the distance between the LED chips, the shape of the light-guiding means 7, the distance from the LED chips 6 to the original P, and the like.

Figure 3:
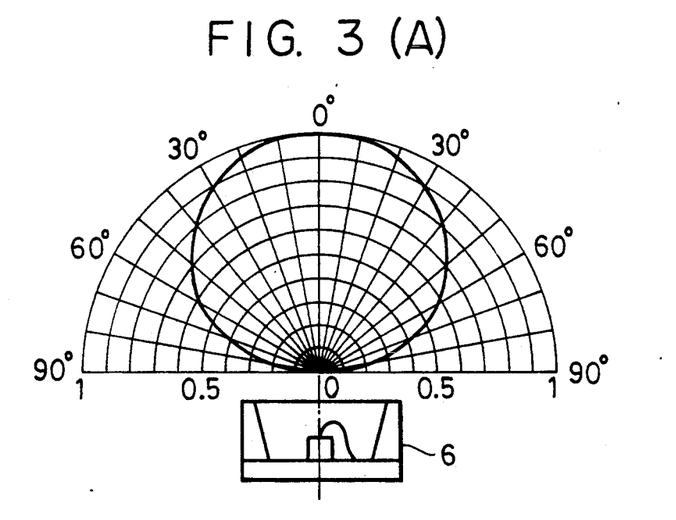
FIGS. 3(A) and 3(B) are schematic views for explaining the directional characteristics of LED chips.

In the first embodiment, since an LED array 3 (in which the LED chips 6 having directional characteristic shown in FIG. 3(A) are arrayed linearly in the main-scanning direction) is used, the correction section 8 is disposed on the side 7b of the light-guiding member 7, above the LED chips 6, as shown in FIG. 2(B). In this embodiment, the correction section 8 is made into a plurality of substantially triangular shapes arranged in the form of an array. With this arrangement, a part of the total reflection of the illuminating light is suppressed so that the illumination on the surface of the original P is made uniform.

The functions performed the correction section 8 include the function of absorbing light and suppressing total reflection, and the function of suppressing total reflection by changing the optical axis of light, or the like.

As a correction section having the function of absorbing light, section 8 is formed by disposing a light absorbing member, i.e., by applying black resin (e.g., carbon black #2400 from Mitsubishi Jushi Kagaku Corp. etc.) on guide 7.

As a correction section having the function of enhancing total reflection, section 8 is formed by disposing a metallic film on the side 7b of the guide 7. (i.e., by depositing aluminum on a glass sheet)

As a correction section having the function of changing the optical axis of light, section 8 is in an arrangement in which a light diffusion member is disposed (i.e., very small irregularities are formed) on the side 7b of the light-guiding means 7 so as to diffuse and/or transmit light.

While, if a correction section has the function of changing the optical axis of light, it may be used without the function of suppressing or enhancing total reflection.

Although the use of the above-described structures are preferable in forming the correction section 8, the present invention is not limited to these structures 8. Any other materials or shapes may be used, if it suitably suppresses or enhances total reflection on the side 7b or changes the optical axis of light, so as to obtain the uniform illumination.

Figure 4:
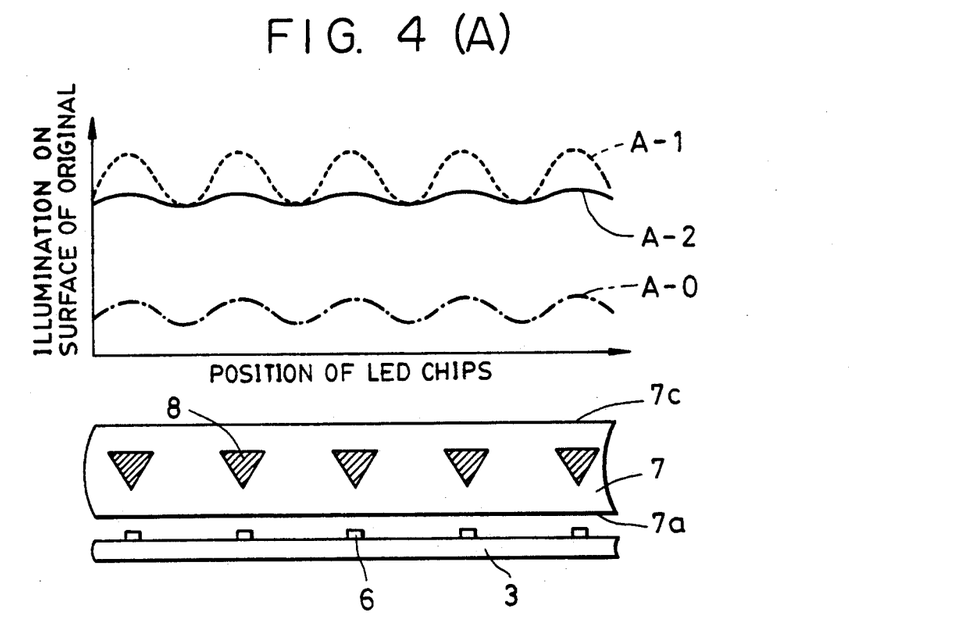
FIGS. 4(A) and 4(B) are graphs for explaining image signal outputs.

FIG. 4(A) is a view for explaining the advantage of the first embodiment. The line (A-0) indicates the distribution of the illumination on the surface of an original by a conventional illumination system. The line (A-1) indicates the distribution of the illumination on the surface of an original by the illumination system in which a light-guiding member is used. The line (A-2) indicates the distribution of the illumination on the surface of an original by the illumination system in which a light-guiding member having a correction section is used. If the surface of an original is illuminated by an LED array not using a light-guiding member, as show by the line (A-0), the illumination on the surface of the original is low, and the unevenness of the illumination is large. If an original is illuminated via a light-guiding member, as shown by the line (A-1), the illumination on the surface of the original is increased as a whole, but the illumination between the LED chips is relatively low, and the unevenness of the illumination is large. On the other hand, if an original is illuminated via a light-guiding member having a correction member, as shown by line (A-2), it can be sen that the original can be illuminated efficiently with high illumination, and the unevenness of the illumination can be decreased considerably.

Figure 5:
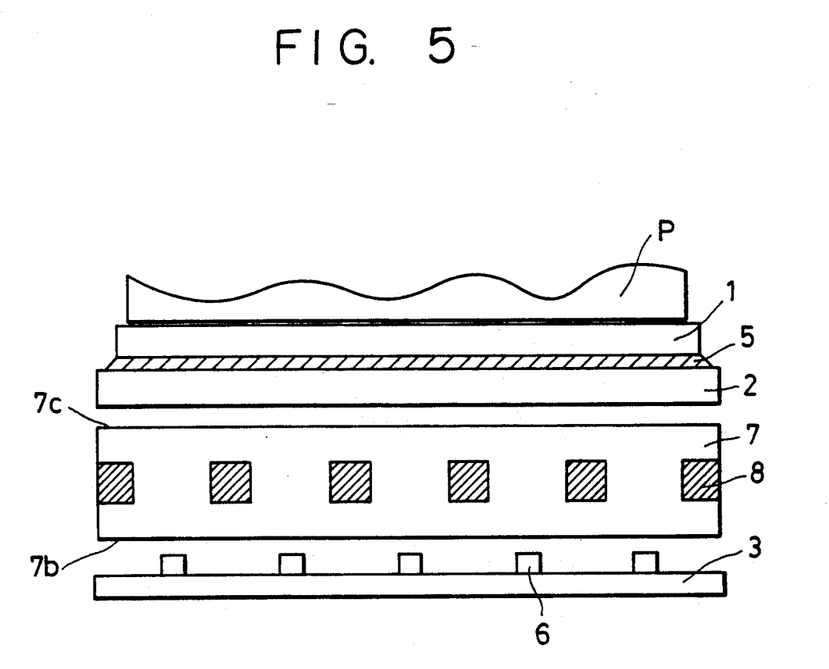
FIG. 5 is a schematic cross-sectional view of a photoelectric conversion device according to a second embodiment of the present invention.

FIG. 5 is a schematic cross-sectional view of a photoelectric conversion device according to a second embodiment of the present invention, as seen form the direction of the photoelectric conversion element array. In the second embodiment, since an LED array is used in which LED chips having direction characteristics shown in FIG. 3(B) are arrayed linearly in the main-scanning direction, the correction section 8 is disposed on the guide 7 in areas between the LED chips 6 so that the total reflection of a part of the illuminating light is suppressed, as shown in FIG. 5. In this embodiment, the correction section 8 comprises a plurality of substantially rectangular shapes arranged in the form of an array.

FIG. 4(B) is a view for explaining the advantage of the second embodiment. The line (B-0) indicates the distribution of the illumination on the surface of an original by a conventional illumination system. The line (B-1) indicates the distribution of the illumination on the surface of the original by the illumination system in which a light-guiding member is used. The line (B-2) indicates the distribution of the illumination on the surface of the original by the illumination system in which a light-guiding member having a correction section is used. According to FIG. 4(B), if a light-guiding member of the second embodiment is used it can le seen that the original can be illuminated efficiently with high illumination and the unevenness of illumination can be decreased considerably as a result of the correction section being provided.

Figure 6:
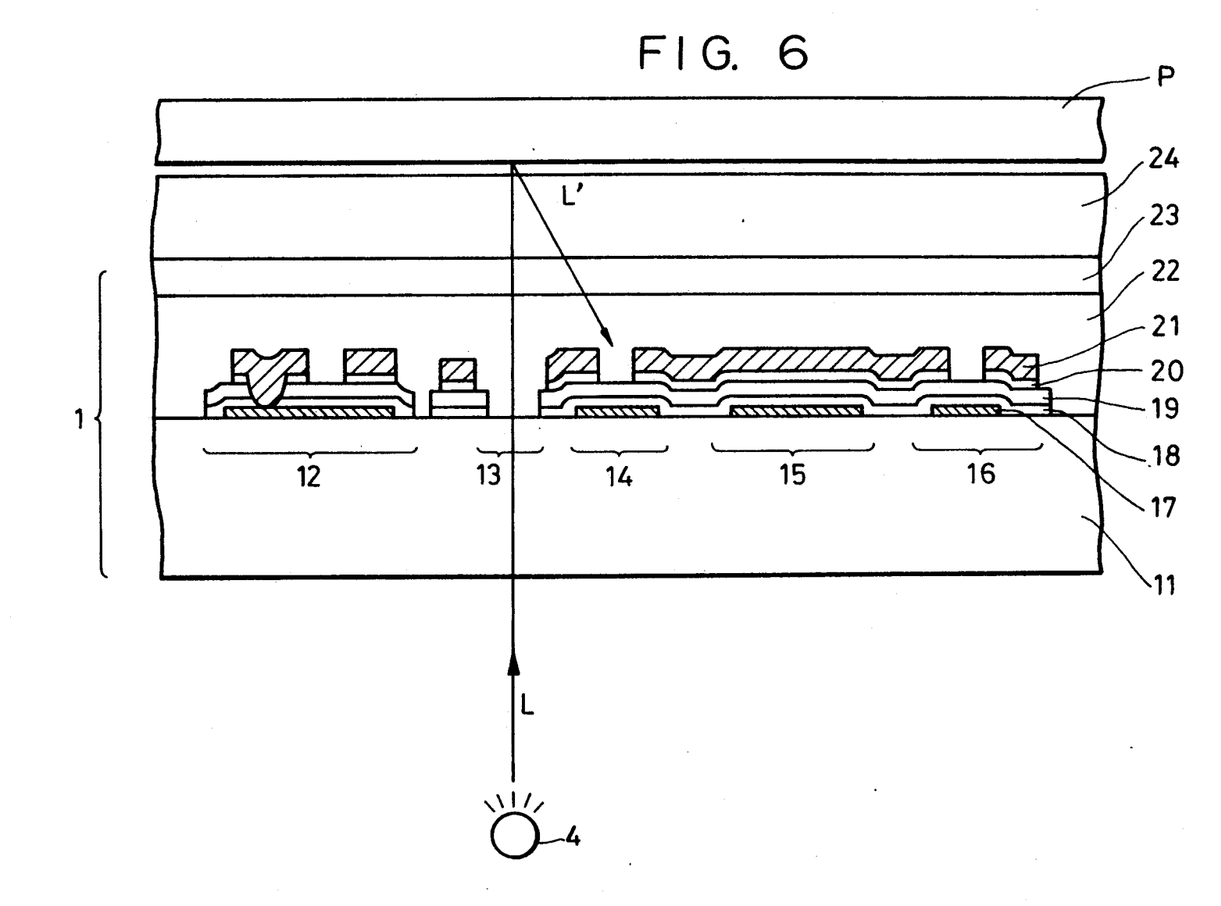
FIG. 6 is a schematic cross-sectional view showing a photosensor unit which is suitable for a photoelectric conversion device according to the present invention.

FIG. 6 is a schematic cross-sectional view of a transparent sensor substrate, serving as a photosensing unit, according to the second embodiment, as seen from the main-scanning direction of a photoelectric conversion element array. On a transparent glass substrate 11 are formed a matrix interconnection wiring portion 12 by a thin-film forming method, an illuminating window 13, photoelectric conversion elements 14, capacitive load charge storage elements 15, and thin-film transistors (TFTs) 16 as switching elements for transferring stored electric charges with the proper timing. Each of these elements is formed by an identical production process by sequentially stacking layers of a light-shielding lower electrode 17 made of Cr, an insulating layer 18 made of SiN, a photoconductive layer 19 made of a—Si:H as a non-single crystalline Si, an ohmic-contact layer 20 made of the n+-type a—Si:H, and an upper light-emitting device 21 made of Al on the glass substrate 11.

The photoelectric conversion elements 14, the charge storage members 15, the TFTs 16 and the like are coated with a passivation layer 22 made of SiN, on which a protective layer 24 made of a micro sheet glass is provided via an adhesive layer 23 made of epoxy resin.

The micro sheet glass 24 has the function of an antifriction layer for protecting the photoelectric conversion elements 14 and the like form friction with the original P, and the function of a spacer for maintaining the distance between the original P and the photoelectric conversion elements 14 constant.

In such a configuration, illuminating light L emitted from a light source 4 provided at the side of the surface of the transparent sensor substrate 1 opposite to the original P illuminates the original P after passing through the transparent portion of the transparent sensor substrate 1. Information-bearing light L' reflected form the original P is incident upon the photoelectric conversion elements 14.

Figure 7:
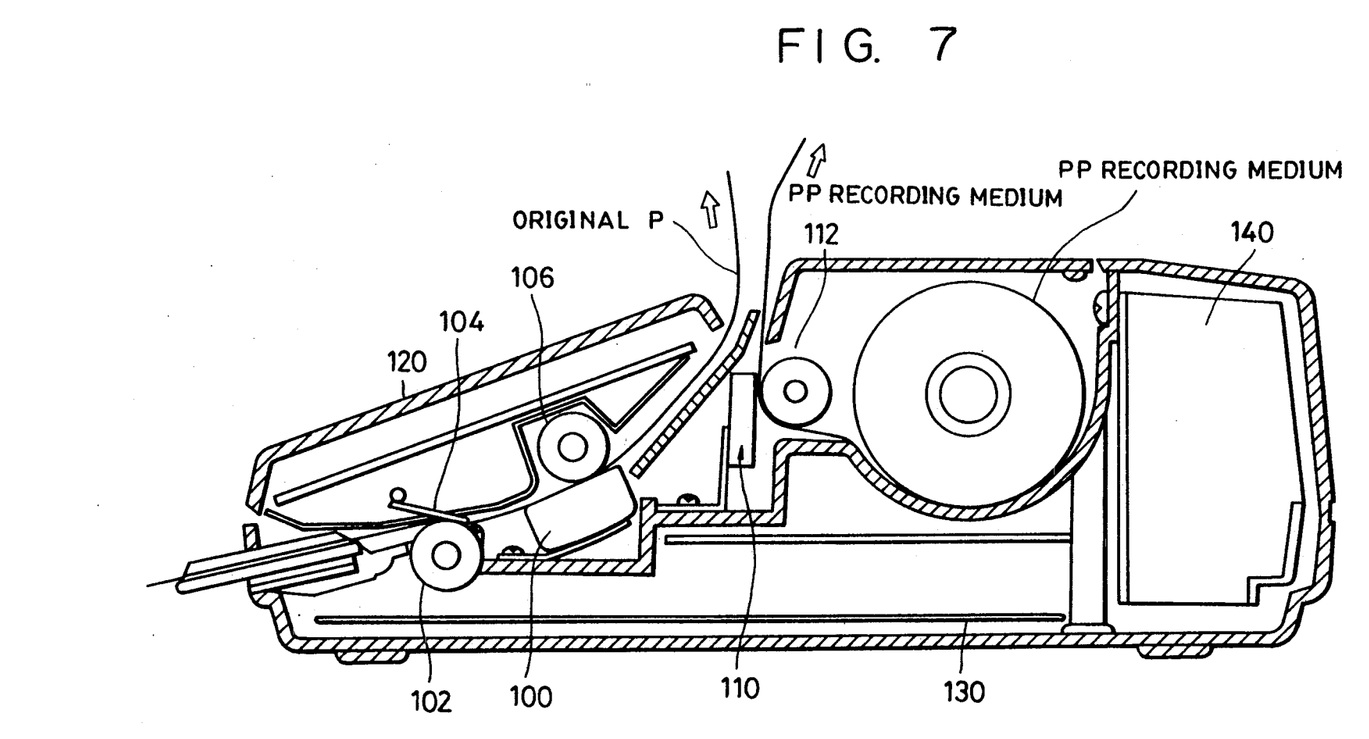
FIG. 7 is a schematic cross-sectional view showing an information processing apparatus according to the present invention.

FIG. 7 illustrates a facsimile machine as an image information processing apparatus which includes the abovedescribed photoelectric conversion device. In FIG. 9, the sensor unit 100 has the photoelectric conversion device and a base plate (not shown). A feeding roller 102 feeds an original P toward a reading position. A separation piece 104 securely separates and feeds each sheet of the original P. A platen roller 106 provided at the reading position facing the sensor unit 100 regulates the surface to be read of the original P, and also serves as a conveying means for conveying the original P.

A recording medium PP has the shape of rolled paper in the illustrated example, or which image information read by the photosensor unit or image information transmitted from the outside in the case of a facsimile or the like is formed. A recording head 110 serves as a recording means for performing the above-described image formation. AS the recording head 110, a thermal print head, an ink-jet recording head, or various other kinds of heads may be used. Furthermore, the recording head 110 may be of a serial scanning type or a full-line type. A platen roller 112 conveys the recording medium PP to a recording position for the recording head 110 and also regulates the recording surface of the recording medium PP.

An operation panel 120, serving as an input/output means, includes switches for providing operation inputs, display units for indicating messages, states of the apparatus and the like, and other control units.

A system control substrate 130, in which controllers, serving as control means are provided, includes, for example, a control unit for controlling respective units, driving circuitry for the sensor unit, a process unit for image information, a transceiver unit, and the like. A power supply 140 supplies the apparatus and the sensor unit with electric power.

As a recording means used in the information processing apparatus of the present invention, a typical arrangement and its operating principle are disclosed, for example, in U.S Pat. No(s). 4,723,129 and 4,740,796. This method is a method of producing images with a liquid that utilizes thermal energy for forming a droplet of the liquid. The method is effective in view of the following: at least one drive signal, corresponding to record information, that causes a sudden temperature rise exceeding nuclear boiling is applied to an electrical thermal converter disposed in correspondence to a sheet cr a liquid path in which a liquid (ink) is held, causing thermal energy to boil the film on the thermal working surface of a boil the recording head. As a result, a bubble in the liquid (ink) having a one-to-one correspondence to this drive signal can be formed. The liquid (ink) is discharged via a discharge opening because of the growth and shrinkage of the bubble, and at least one droplet is formed.

Further, a recording head of a full-line type having a length corresponding to the width of a maximum recording medium that a recording apparatus can record may be of either an arrangement of one recording head that satisfies the above length or an arrangement of a recording head assembly formed by a combination of a plurality of recording heads. These recording heads are disclosed in the abovementioned U.S. patents.

In addition, the present invention is effective in cases where a replaceable chip type recording head is used that electrically connected with the apparatus's main body and receives a supply of irk when the chip is mounted on the apparatus' main body, or where a cartridge type recording head is used in which an ink tank is integrally disposed in the recording head itself.

When an original was illuminated by using the above-described first and second embodiments in the apparatus shown in FIG. 7 and a read-out was performed, a very stable, uniform read-out was achieved.

As has been explained above, according to the present invention, a substrate with a plurality of photoelectric conversion elements disposed on a side opposing an original and a light source in which a plurality of light-emitting sources are disposed, are provided. In the photoelectric conversion elements, light emitted form a light source and reflected from the original is received by the photoelectric conversion element. A light-guiding means having on its side a correction means for suppressing total reflection of a part of the illuminating light is disposed between the photoelectric conversion element and the light source. As a result, the illumination on the surface of the original is increased and made uniform, and a low cost an miniaturized a photoelectric conversion device can be achieved.

Also, according to the present invention, a photoelectric conversion device which is capable of performing a stable, uniform readout at all times can be provided.

The individual components shown in outline or designate by blocks in the Drawings are all well known in the photoelectric conversion arts and their specific construction and operation are not critical to the operation or best mode for carrying cut the invention.

While the present invention has been described with respect to what are presently considered the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An illumination improvement device for use in a photoelectric conversion system having (a) a substrate on which a plurality of photoelectric conversion elements are disposed, and (b) a light source in which a plurality of light-emitting sources are arrayed, light emitted from the light source illuminating an original and the light reflected therefrom being received by the photoelectric conversion elements, the device comprising:
   a light guiding means, through which the light passes, disposed between the original and the light source, said light guiding means having a light incident surface, a light emission surface, and a side surface; and
   a correction means disposed on the side surface of said light guiding means.

2. A device according to claim 1, wherein said correction means comprises a light absorbing member for absorbing light.

3. A device according to claim 1, wherein said correction means comprises an optical axis changing member for changing an optical axis of the emitted light.

4. A device according to claim 1, wherein said correction means comprises an irregular section disposed on a side surface of said light-guiding means.

5. An information processing apparatus comprising:
   a photoelectric conversion device including (a) a substrate on which a plurality of photoelectric conversion elements are disposed, and (b) a light source in which a plurality of light-emitting sources are arrayed, light emitted from the light source illuminating an original and the light reflected therefrom being received by the photoelectric conversion elements;
   a light guiding means, through which the light passes, disposed between the original and said light source, said light guiding means having a light incident surface, a light emission surface, and a side surface;
   a correction means disposed on the side surface of said light guiding means;
   means for holding the original at a reading position; and
   control means for controlling an operation of said photoelectric conversion device.

6. An information processing apparatus as claimed in claim 5, further comprising a recording head.

7. An information processing apparatus as claimed in claim 6, wherein said recording head comprises an ink jet recording head.

8. An information processing apparatus as claimed in claim 7, wherein said recording head comprises a head for producing an image with ink and utilizes thermal energy for forming a drop of the ink.

9. An information processing apparatus as claimed in claim 6, wherein said information processing apparatus comprises a facsimile machine.

10. An image sensor, comprising:
    a plurality of light-emitting sources that emit light for illuminating an original;
    a substrate having a light-transmitting section that transmits the light;
    a plurality of photoelectric conversion elements disposed on said substrate;
    a light guiding member, through which said light passes, disposed between said substrate and said light source, said light guiding member having a light incident surface, a light emission surface, and a side surface; and
    a correction member disposed on said side surface.

11. Apparatus for improving illumination in a photoelectric conversion device having a light source for illuminating an original, and at least one photoelectric conversion element for receiving light reflected from the original, comprising:
    a light guide, disposed between the light source and the original, for guiding light from the light source toward the original, said light guide having a light incident surface, a light emission surface, and at least one side surface; and
    a correction section disposed adjacent said side surface.

12. Apparatus according to claim 11, wherein said correction section comprises a light absorbing member formed on said side surface.

13. Apparatus according to claim 12, wherein said light absorbing member comprises a plurality of light absorbing elements regularly spaced in a direction substantially parallel to a longitudinal axis of said light guide.

14. Apparatus according to claim 13, wherein each of said light absorbing elements is shaped in the form of a square.

15. Apparatus according to claim 11, wherein said correction section comprises a light diffusion member formed on said side surface.

16. Apparatus according to claim 15, wherein said light diffusion member comprises a plurality of irregularities formed in said side surface.

17. Apparatus according to claim 11, wherein said light guide has a light entrance surface two side surface, and a light emission surface, and wherein a correction section is disposed adjacent each side surface.

18. Apparatus according to claim 11, wherein said correction section is disposed in a plane which is substantially parallel to a propagation direction of the light emitted form the light source.

19. Apparatus according to claim 11, wherein the light source has a plurality of light source elements, and wherein said correction section comprises a plurality of correction elements each being disposed above a corresponding light source element in a direction parallel to a propagating direction of the emitted light.

20. Apparatus according to claim 11, wherein the light source has a plurality of light source elements, and wherein said correction section comprises a plurality of correction elements each being disposed above but between adjacent light source elements.

21. Apparatus according to claim 13, wherein each of said light absorbing elements is shaped in the form of a triangle.

* * * * *

UNITED STATES PATENT AND TRADEMARK OFFICE
CERTIFICATE OF CORRECTION

PATENT NO. : 5,187,595
DATED : February 16, 1993
INVENTOR(S) : Masashi Kitani, et al.

It is certified that error appears in the above-indentified patent and that said Letters Patent is hereby corrected as shown below:

COLUMN 1

Line 56, "rf" should read --of--.

COLUMN 2

Line 27, "chip" should read --chips--.

COLUMN 4

Line 36, "e" should read --a--.
Line 54, "form" should read --from--.

COLUMN 5

Line 8, "form" should read --from--.
Line 40, "performed" should read --performed by--.

COLUMN 6

Line 24, "sen" should read --seen--.
Line 29, "form" should read --from--.
Line 52, "le" should read --be--.

COLUMN 7

Line 15, "form" should read --from--.
Line 25, "form" should read --from--.
Line 29, "abovedescribed" should read --above-described--.
Line 45, "AS" should read --As--.

UNITED STATES PATENT AND TRADEMARK OFFICE
CERTIFICATE OF CORRECTION

PATENT NO. : 5,187,595
DATED : February 16, 1993
INVENTOR(S) : Masashi Kitani, et al.

It is certified that error appears in the above-indentified patent and that said Letters Patent is hereby corrected as shown below:

COLUMN 8

Line 7, "cr" should read --or--.
Line 22, "abovementioned" should read --above-mentioned--.
Line 26, "irk" should read --ink--.
Line 39, "form" should read --from--.
Line 47, "an" should read --and-- and "a" should be deleted.
Line 53, "ignate" should read --ignated--.
Line 57, "cut" should read --out--.

COLUMN 10

Line 41, "two side surface," should read --, two side surfaces,--.
Line 47, "form" should read --from--.

Signed and Sealed this

Fifteenth Day of March, 1994

Attest:

BRUCE LEHMAN

Attesting Officer

Commissioner of Patents and Trademarks